United States Patent
Hendricks, Jr.

(10) Patent No.: US 12,067,874 B2
(45) Date of Patent: *Aug. 20, 2024

(54) TRAFFIC CONTROL SYSTEM

(71) Applicant: PIONEER INDUSTRIAL SYSTEMS, LLC, Alvordton, OH (US)

(72) Inventor: Todd Hendricks, Jr., Monclova, OH (US)

(73) Assignee: PIONEER INDUSTRIAL SYSTEMS, LLC, Alvordton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,114

(22) Filed: Dec. 28, 2022

(65) Prior Publication Data

US 2023/0137923 A1    May 4, 2023

Related U.S. Application Data

(63) Continuation of application No. 17/224,333, filed on Apr. 7, 2021, now Pat. No. 11,626,014.
(Continued)

(51) Int. Cl.
*G08B 21/00* (2006.01)
*G05D 1/00* (2006.01)
(Continued)

(52) U.S. Cl.
CPC ......... *G08G 1/0955* (2013.01); *G05D 1/0088* (2013.01); *G05D 1/0221* (2013.01);
(Continued)

(58) Field of Classification Search
CPC ...... G08G 1/0955; G08G 1/20; G05D 1/0088; G05D 1/0221; G05D 1/0274; G05D 1/0278; G05D 2201/0213
(Continued)

(56) References Cited

U.S. PATENT DOCUMENTS 6,118,388 A    9/2000  Morrison
9,972,205 B2   5/2018  Beaulieu
(Continued)

OTHER PUBLICATIONS

Jackson, Richard J. et al., 3D printing of asphalt and its effect on mechanical properties, Article, Materials and Design, Dec. 15, 2018, pp. 469-474, vol. 160, Elsevier Ltd., U.S.

*Primary Examiner* — Mark S Rushing
(74) *Attorney, Agent, or Firm* — Jacob M. Ward; Ward Law Office LLC

(57) ABSTRACT

A traffic controlling system is provided that can include a platform, a sensor, and a control unit. The platform can have a top side, a locomotion system, and a receiving area. The locomotion system can be configured to move the platform into a preselected position. The receiving area configured to receive a traffic indicator module. The sensor, which can include a camera, can be configured to generate location data of the platform. The camera can capture or record surrounding data for navigational purposes or for other highway traffic control and monitoring purposes. The control unit can be configured to receive the location data. The control unit can also be configured to determine if the platform is in the preselected position. The control unit can be further configured to execute instructions including the pathway that the platform needs to travel to be positioned in the preselected position.

19 Claims, 7 Drawing Sheets

Related U.S. Application Data

(60) Provisional application No. 63/007,789, filed on Apr. 9, 2020.

(51) Int. Cl.
*G08G 1/00* (2006.01)
*G08G 1/0955* (2006.01)

(52) U.S. Cl.
CPC ......... *G05D 1/0274* (2013.01); *G05D 1/0278* (2013.01); *G08G 1/20* (2013.01)

(58) Field of Classification Search
USPC .......................................................... 340/908
See application file for complete search history.

(56) References Cited

U.S. PATENT DOCUMENTS

| | | |
|---|---|---|
| 2008/0198038 A1 | 8/2008 | Yingst |
| 2010/0198454 A1* | 8/2010 | Sugawara ................ G08G 1/20 701/31.4 |
| 2016/0122956 A1 | 5/2016 | Christiansen |
| 2018/0326901 A1* | 11/2018 | Boyle ...................... B60Q 7/00 |
| 2018/0342153 A1 | 11/2018 | Ellis et al. |
| 2019/0019408 A1* | 1/2019 | Beaulieu .................. G08G 1/07 |
| 2019/0138020 A1* | 5/2019 | Uemura .................. A01D 34/00 |
| 2020/0317216 A1* | 10/2020 | Konrardy ............ B60W 30/182 |
| 2021/0277613 A1 | 9/2021 | Hendricks, Sr. |

* cited by examiner

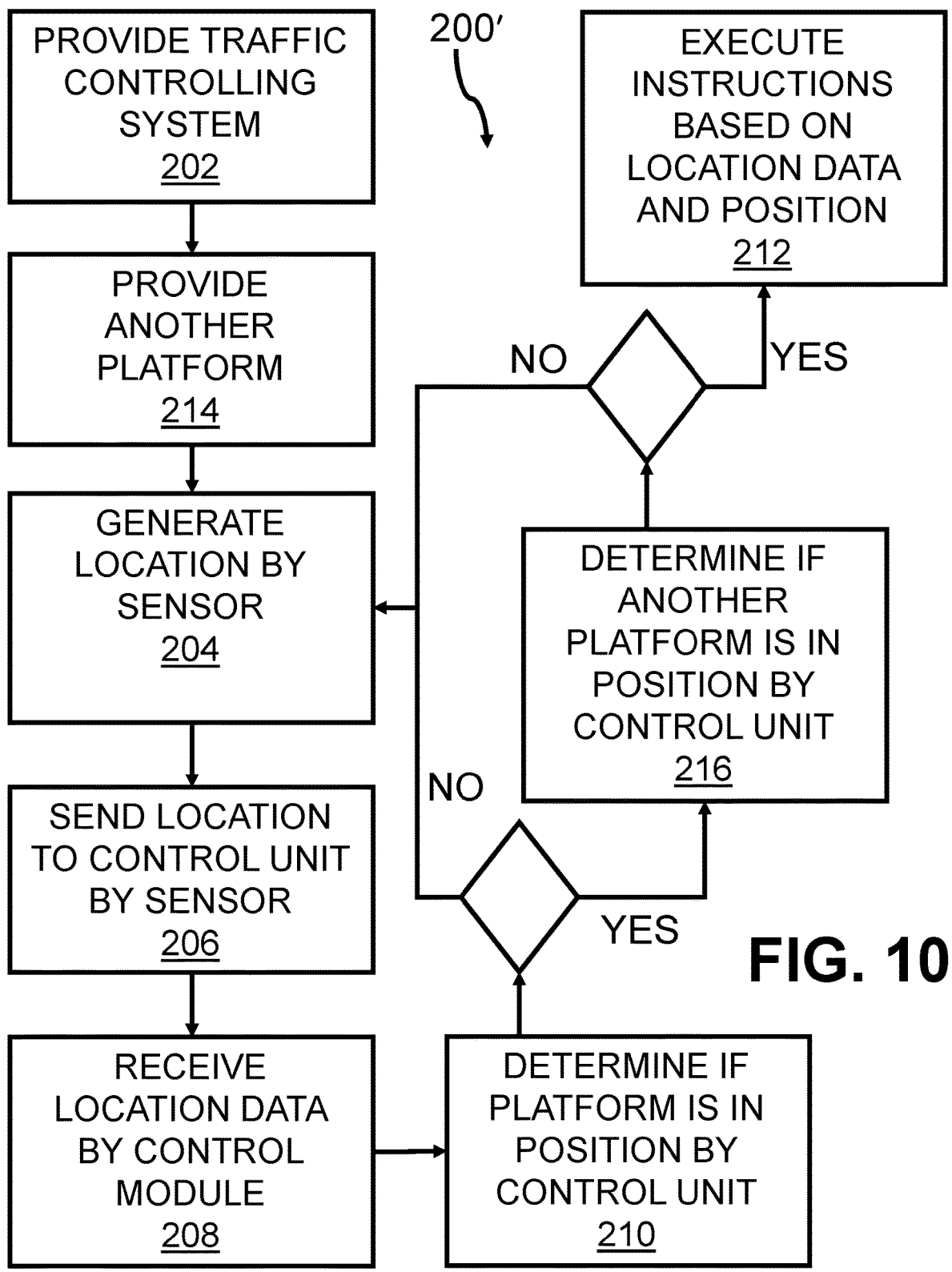

TRAFFIC CONTROL SYSTEM

CROSS-REFERENCE TO RELATED APPLICATIONS

This application is a continuation of U.S. patent application Ser. No. 17/224,333, filed on Apr. 7, 2021, which claims the benefit of U.S. Provisional Application Ser. No. 63/007,789, filed on Apr. 9, 2020. The entire disclosures of the above applications are incorporated herein by reference.

FIELD

The present technology relates to traffic control devices, more particularly, to automated traffic control devices.

INTRODUCTION

This section provides background information related to the present disclosure which is not necessarily prior art.

Traffic control devices can include markers, signs, and signal devices used to inform, guide, and control traffic, including pedestrians, motor vehicle drivers and bicyclists. These devices are usually placed adjacent, over or along the highways, roads, traffic facilities, and other public areas that require traffic control. Such traffic control devices can range from passive signage to active lamps and signals.

Traffic control devices can protect workers in various settings, including work event settings on roadways, bridges, tunnels, utilities, and other infrastructure from various hazards outside and inside of the work event zone. Hazards can include damages or injuries resulting from excessive speeding, being struck by an object, moving equipment, and or accidents from distracted drivers. However, traditional traffic control devices can have shortcomings related to the following:

SAFETY FOR WORKERS: In event zones, especially on two lane roads, workers are often used to help control the flow of traffic. These workers stand on the road, exposed to traffic, with signs and communication devices working together to stop and control one or more lanes of traffic. In today's world of distracted driving, these workers are at increased risk of being struck by an oncoming vehicle.

COMMUNICATION: Part of the requirement of work event zones is that signage must be displayed at a specified distance before the start of the event zone and communicate the hazard quickly. Undesirably, traditional traffic control devices can be limited in displaying one particular type of message (e.g., a stop sign can only be used to stop traffic).

EMERGENCY RESPONSE TIME: There are always going to be accidents on the highways which require getting emergency response vehicles to the scene, and setting up external traffic control which requires time, equipment, and people. Reducing response times can save lives.

FIXED EVENT ZONES: Traditional event zones are fixed and do not move as the work progress along the road, where workers are hence required to physically move the traffic control devices as the event zone progresses. Since setting up event zones can be labor intensive, some construction companies will section off large areas of the road that might be worked on during the course of a day, week, or even longer. These event zones are longer than required and negatively impact traffic more than what is necessary.

ENVIRONMENTAL IMPACT: Traditional event zones can require trucks to assist in setting up and tearing down event zones. Trucks are driven by workers to the sign locations, stopped while idling, so the sign can be put up or taken down, moved to the next area, and repeated.

ERGONOMICS: Traditional event zones typically require workers to be outside for prolong periods, standing on hard pavement in the blistering heat or shivering in cold. The ergonomics of lifting and moving traffic control devices also poses an ergonomic risk to road workers.

LABOR: It can be very difficult to hire and retain people, especially for very physical and demanding jobs that can include uncomfortable working conditions.

COST: The rising cost of road maintenance impacts everyone, as taxpayers ultimately pay for road maintenance. It is very costly to maintain and construct roads.

These inefficiencies have challenged engineers and planners to design traffic control devices that permit an optimal flow of vehicles, while militating against the aforementioned issues.

There is a continuing need for a traffic controlling system and method that can automatically position a traffic controller. Desirably, such a traffic controlling system and method can be modular to implement multiple traffic control options.

SUMMARY

In concordance with the instant disclosure, a traffic controlling system and method that can automatically position a traffic controller, and which can be modular, has been surprisingly discovered.

In certain embodiments, traffic controlling systems are provided that can include a platform, a sensor, and a control unit. The platform can have a top side, a locomotion system, and a receiving area. The locomotion system can be configured to move the platform into a preselected position. The receiving area can be disposed on the top side and configured to receive a traffic indicator module. The sensor can be configured to generate location data of the platform. The control unit can be in communication with the sensor and the locomotion system. The control unit can be configured to receive the location data. The control unit can also be configured to determine if the platform is in the preselected position. The control unit can be further configured to execute instructions including the pathway that the platform needs to travel to be positioned in the preselected position.

In certain embodiments, traffic controlling systems are provided that can include another platform configured in a similar fashion to the platform. The locomotion system of the another platform can be configured to move the another platform into a preselected warning distance. The warning distance can be defined as a gap between the another platform and the platform. The sensor can be configured to generate location data of one of the platform and the another platform. The instructions can also include a warning pathway that the another platform needs to travel to be positioned in the preselected warning distance.

In certain embodiments, ways of using such traffic controlling systems are provided. The sensor can generate location data of the platform. The sensor can send the location data to the control unit. The control unit can receive the location data. The control unit can determine if the platform is in the preselected position by comparing the preselected position with the location data. The control unit can execute the instructions including the pathway that the platform needs to travel to be positioned in the preselected position.

It is also possible that one or more platforms can be configured to be automatically deployed to a set location. One or more platforms can also be configured to be automatically positioned in a preselected location until called back if the event zone is fixed. If the event zone is a moving event zone, the platform(s) can be configured to be positioned at a preselected distance away from the moving event zone based on references points disposed in the event zone. The reference points can include trucks, equipment, workers, flags, markers, GPS locations, etc. Or it could be programmed to run specific operations, paths, or move things from point to point.

The platform can have a plurality of traffic indicator modules which can relate to traffic communication tools that can include road signs, flags, flashing lights, LED monitors, traffic lights, stop signs, etc. These can permit the platform to convey the required event zone notification to traffic via signs, signals, lights, flashing arrows, message boards, and or other communications means. The platform can control traffic of roads by replacing the workers with mounted communication devices and connected stoplights with the capability of communicating to a host vehicle and or additional traffic platforms.

The platform can be used with a fixed event zone or a movable event zone. Traditionally, event zones are fixed and are set up for the work schedules for the entire day. Also, the advanced notification signs were fixed. Undesirably, the workers were exposed to danger. By using the platform, signage and stop lights can be mounted to a moving device, set to hold a fixed position and or stay at the preselected distance away from reference points within the event zone. This can allow the event zone to be smaller and still be safe by moving the signage with the event zone, thus shortening and improving the flow of traffic.

The platform can be designed to create flexible, safe event zones and be automatically retrieved and/or picked up to return to the maintenance garage safely. By utilizing the platform in conjunction with other technology, workers can be reduced or completely removed from the road, which can dramatically improve worker safety and cost savings.

The plurality of modules can also include sensors that gather data. Non-limiting examples of the data can include traffic patterns, traffic density, road quality, weather conditions, etc. Other modules could perform various functions of road maintenance, such as air blow off, vacuuming, and other tasks.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 9:
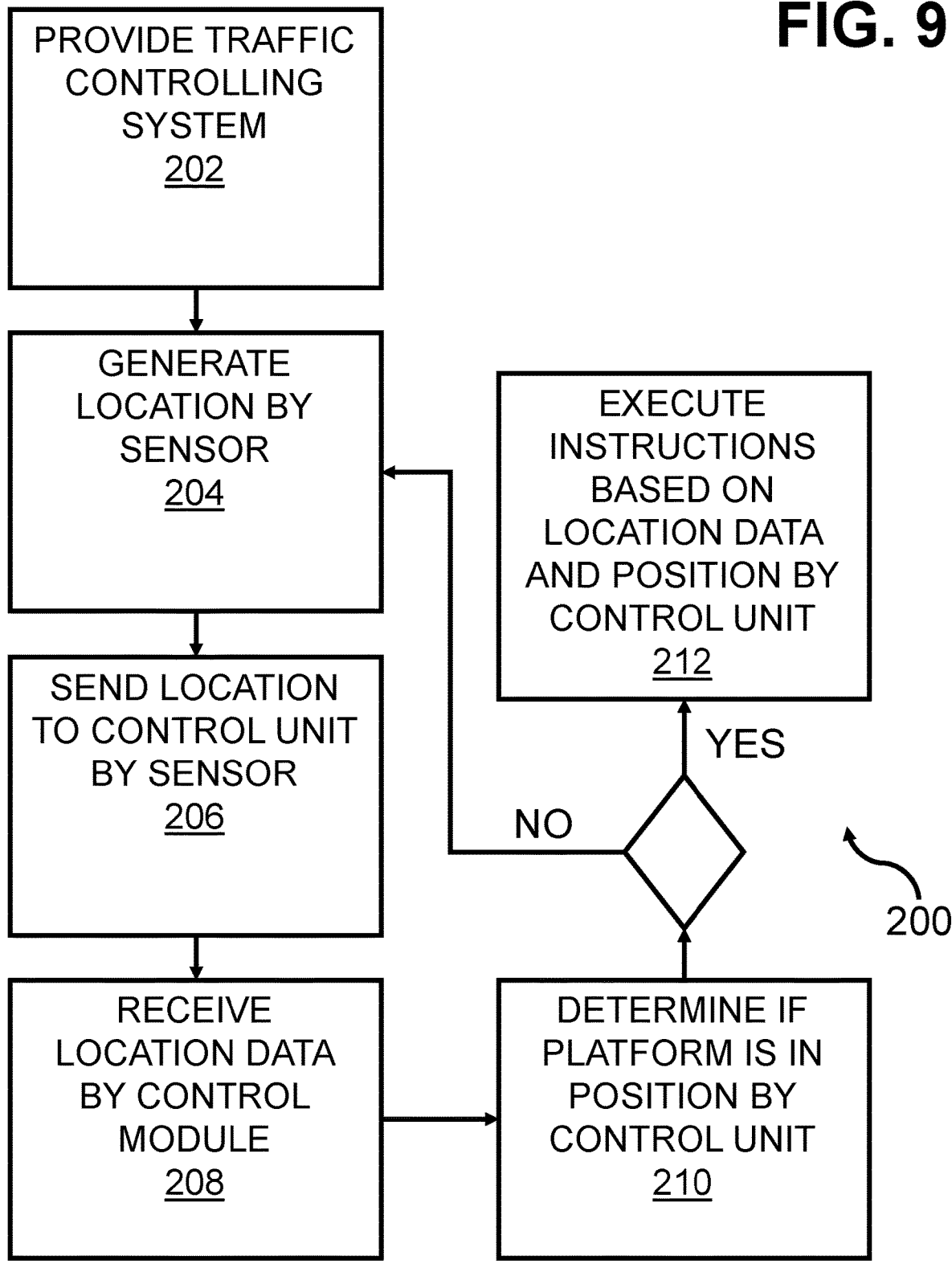

FIG. 9 is a flowchart illustrating a method of using the traffic controlling system, according to an embodiment of the present disclosure, showing a step of determining if the platform is in a preselected position by the control unit; and FIG. 10 is a flowchart illustrating a method of using the traffic controlling system, according to an embodiment of the present disclosure, showing a step of determining if the another platform is in a preselecting warning distance.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
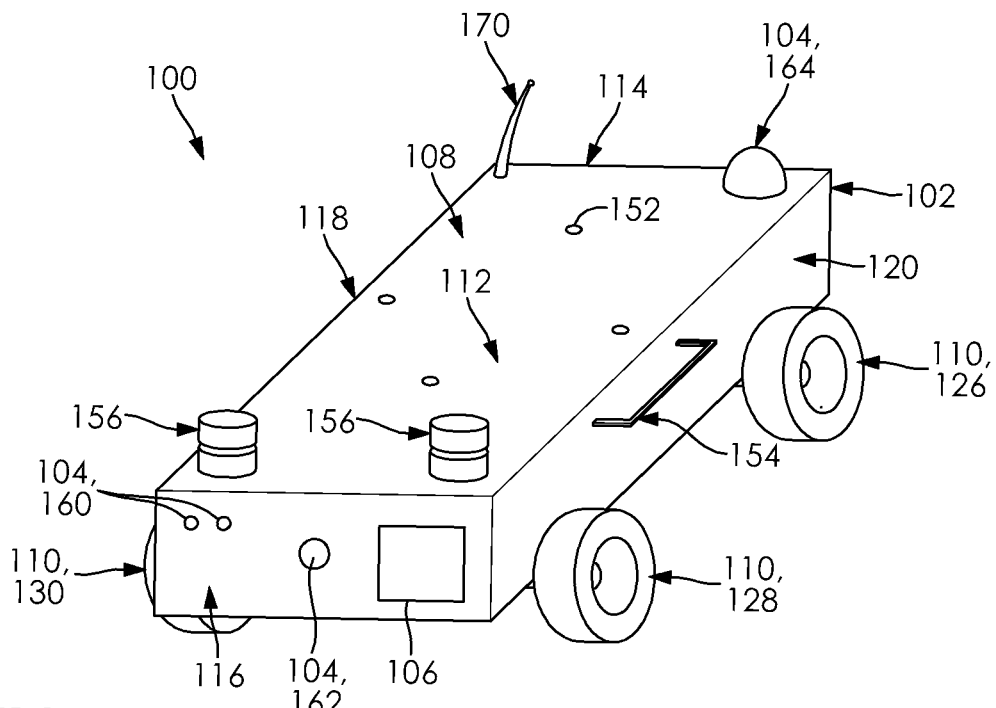
FIG. 1 is a top perspective view of a traffic controlling system, according to an embodiment of the present disclosure, showing a platform having a locomotion system, a sensor, and a control unit.
Figure 2:
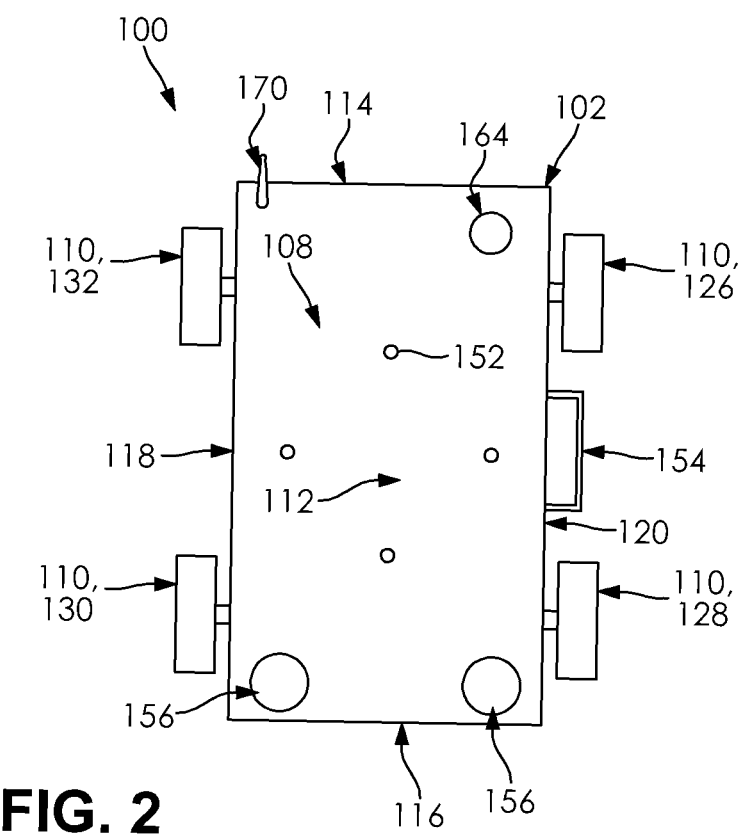
FIG. 2 is a top plan view of the traffic controlling system shown in FIG. 1, showing a receiving area having a plurality of apertures.

With reference to FIGS. 1-6, a traffic controlling system 100 is shown. The traffic controlling system 100 can include a platform 102, a sensor 104, and a control unit 106. The platform 102 can have a top side 108, a locomotion system 110, and a receiving area 112, as shown in FIG. 2. In certain examples, the platform 102 can include multiple sides, including the top side 108, a rear side 114, a front side 116, a left side 118, and a right side 120. However, it should be appreciated that a skilled artisan can select different shapes for the platform 102, within the scope of this disclosure.

The locomotion system 110 can be configured to move the platform 102 into a preselected position 122. Now referring to FIG. 6, the preselected position 122 can be a location adjacent to an event zone 124 that is chosen by the user. In some instances, the preselected position 122 can be inside the event zone 124. The event zone 124 can be a construction site, a car accident, a road closure, an intersection used for crowd control, event traffic management, and including other environments in which traffic control is desired. The event zone 124 can also be any other traffic-related event. In certain examples, the event zone 124 can be a moving event zone 124. The moving event zone 124 can be configured to move after a particular action. For example, the moving event zone 124 can be a construction site that is configured to move along a road as work is completed. Desirably, this can facilitate more efficient road work by allowing only the portion of the road that is presently being worked on to be closed instead of an entire stretch of road.

Non-limiting examples of the locomotion system 110 can include wheels, tracks, treads, and rotary wings. In certain examples, the locomotion system 110 can include a first wheel 126, a second wheel 128, a third wheel 130, and a fourth wheel 132, as shown in FIG. 2. Desirably, the locomotion system 110 can permit the platform 102 to be moved to the preselected position 122 without having to be manually moved to the preselected position 122 by hand. The traffic controlling system 100 can also include a power source (not shown). The power source can be in communication with the locomotion system 110 and be configured to power the locomotion system 110. Non-limiting examples of the power source can include a battery, a generator, and electromagnetic power transfer that can power an electric motor or other power transfer means to drive the locomotion system 110. However, it should be appreciated that a person skilled in the art can employ different technologies for the locomotion system 110 for the traffic controlling system 100, as desired.

Figure 3:
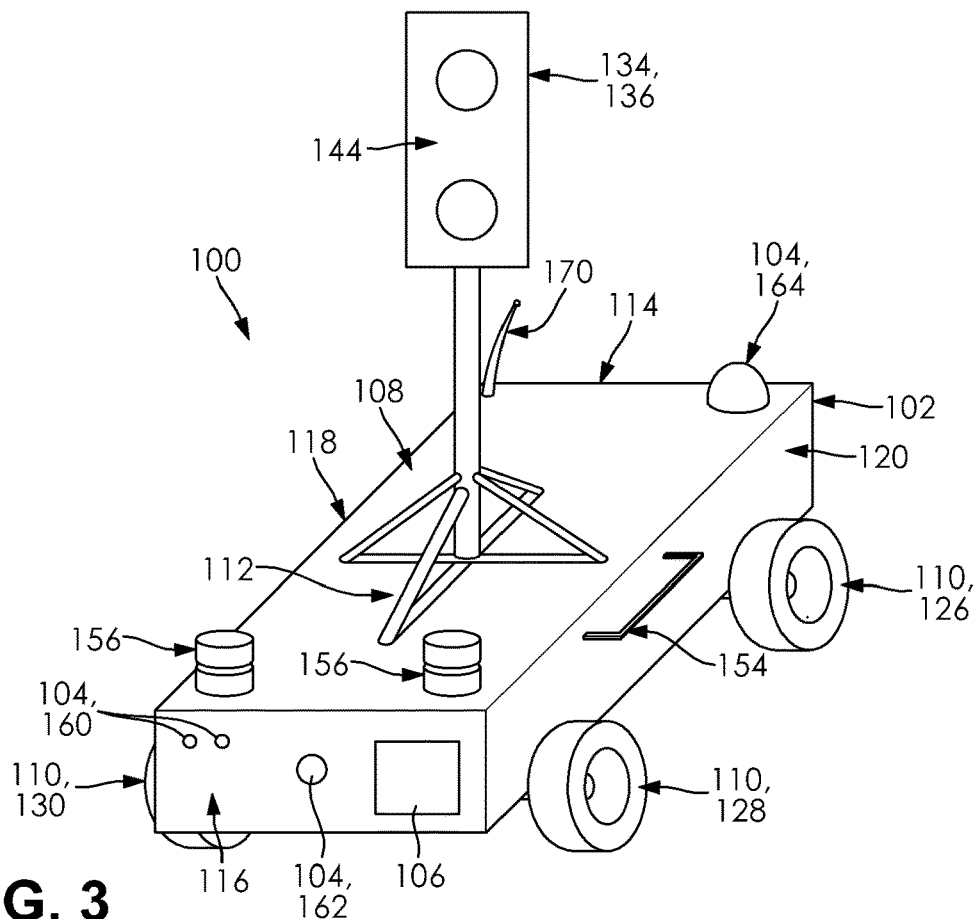
FIG. 3 is a top perspective view of the traffic controlling system, according to an embodiment of the present disclosure, including a traffic light module.
Figure 4:
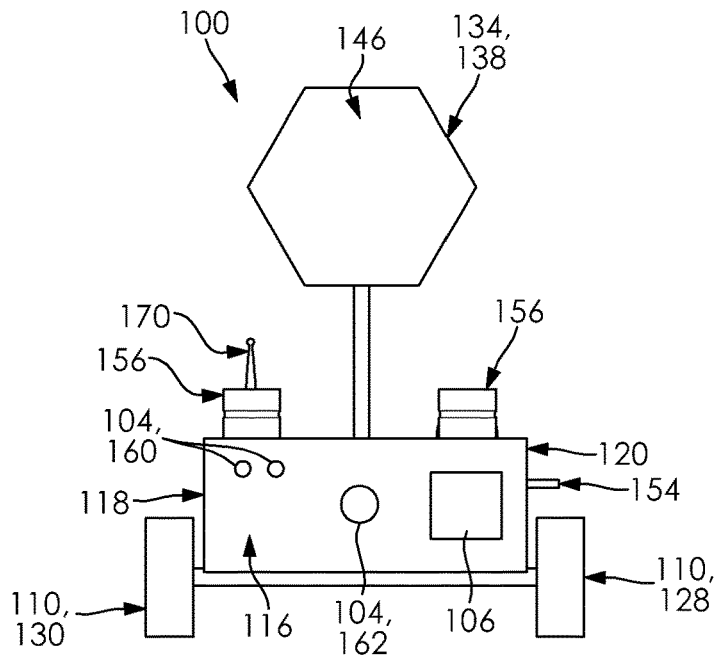
FIG. 4 is a front elevational view of the traffic controlling system, according to an embodiment of the present disclosure, including a stop sign module.
Figure 5:
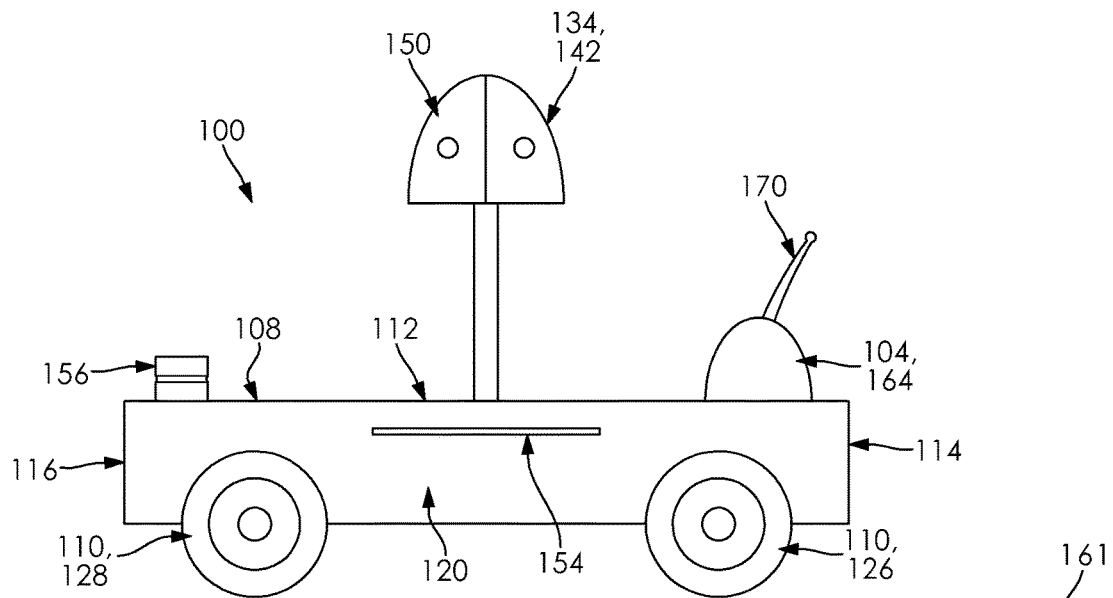
FIG. 5 is a right side elevational view of the traffic controlling system, according to an embodiment of the present disclosure, including an emergency module.
Figure 6:
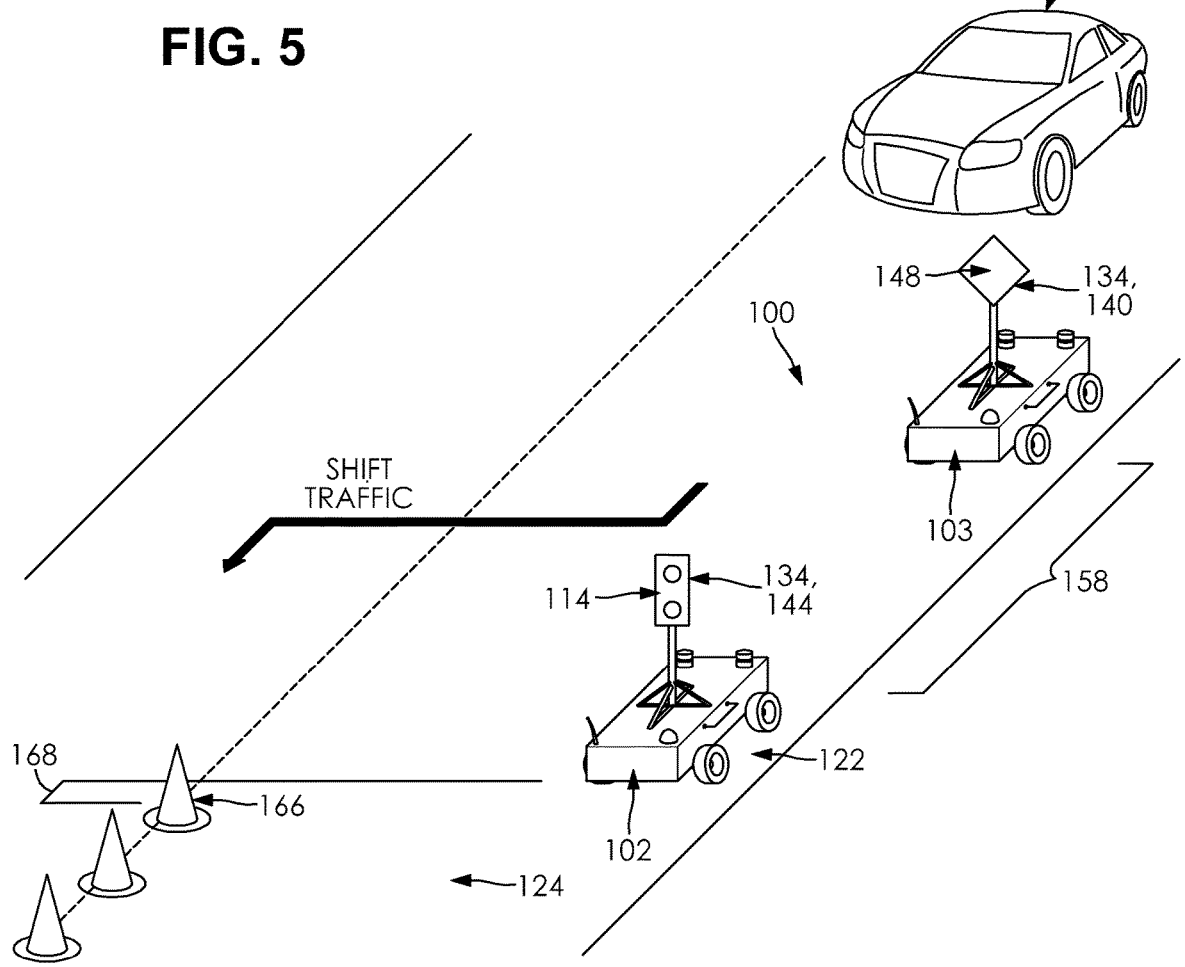
FIG. 6 is a top perspective view of the traffic controlling system disposed adjacent to an event zone, where the platform includes the traffic light module and another platform includes a warning module.

While referencing FIGS. 3-6, the receiving area 112 can be configured to receive a traffic indicator module 134. The traffic indicator module 134 can be configured to communicate traffic hazards and traffic conditions. Non-limiting examples of the traffic indicator module 134 can include road signs, flags, flashing lights, monitors and various types of active displays, traffic lights, emergency lights, stop signs, and other traffic signs or indicators. In certain examples, the traffic indicator module 134 can be at least one of a traffic light module 136, a stop sign module 138, a warning module 140, and an emergency module 142. Now referring to FIGS. 3 and 6, the traffic light module 136 can include traffic lights 144 to control the flow of traffic. The stop sign module 138 can include a stop sign 146 that can indicate to drivers that they must come to a complete stop momentarily, as shown in FIG. 4. With reference to FIG. 6, the warning module 140 can include a warning sign 148 that can indicate the presence, nature, and/or distance of the event zone 124. As shown in FIG. 5, the emergency module 142 can include an emergency light 150 that can be used to signify that a driver is approaching an event involving emergency services, such as a car accident. This can include flashing the emergency light at a set interval. It should be appreciated that one skilled in the art can select different traffic indicators for the traffic indicator module 134, within the scope of this disclosure.

In certain examples, the receiving area 112 can be configured to receive road maintenance modules (not shown). The road maintenance modules can be configured to perform various tasks necessary to maintain the upkeep on roads. Non-limiting examples can include air blow modules and vacuuming modules. Further examples can be found in U.S. Ser. No. 17/189,841 to Hendricks, the entire disclosure of which is incorporated herein by reference. It should be appreciated that a skilled artisan can employ different technologies for the road maintenance modules, as desired.

Now referring to FIGS. 1-2, in certain examples, the receiving area 112 includes a plurality of apertures 152. Each of the plurality of apertures 152 can be configured to receive a fastener to connect the traffic indicator module 134 to the receiving area 112 of the platform 102. This can permit the user to easily connect or disconnect the traffic indicator module 134 from the platform 102. Advantageously, the user can connect the traffic indicator module 134 to the platform 102, according to the given task. For example, if the platform 102 is going to be used to control a flow of traffic, then the user can connect the traffic light module 136 to the platform 102 via the receiving area 112, as shown in FIG. 6. It should be appreciated that although the plurality of apertures 152 has shown to be useful, a skilled artisan can employ different receiving means for the receiving area 112, as desired. For example, the receiving means can include brackets, adhesives, quick release couplings, etc.

With reference to FIGS. 1-6, the platform 102 can also include a handle 154 and at least one safety light 156. The handle 154 can be configured to be used as a gripping point for the platform 102. Desirably, the user can grip the handle 154 to pick up the platform 102 for easy transportation. In certain examples, the handle 154 can be disposed on at least one of the left side 118 and the right side 120. It should be appreciated that one skilled in the art can scale the number of handles 154, within the scope of this disclosure.

The safety light 156 can be configured to illuminate the surroundings and/or act as a marker or strobe light. Desirably, the safety light 156 can be used in combination with a camera to capture images and videos of objects and the environment even in the dark. In addition, the safety light 156 can be used to alert traffic to specific events, like the event zone 124. In certain examples, the safety light 156 can be disposed on the top side of platform adjacent to the front side 116. It should be appreciated that a person skilled in the art can employ the safety light 156 for different functions, as desired.

As shown in FIG. 6, the traffic controlling system 100 can include another platform 103. In certain instances, the another platform 103 can be identical to function and/or structure to the platform 102. It should be appreciated that any components, features, functions of the platform 102 can be applied in the same fashion to the another platform 103. While not shown, the present technology contemplates additional platforms, including a third or fourth platform, and so on. Again, these additional platforms can include any components, features, functions of the platform 102 as further identified herein. Like or related structures of the platform 102 and the another platform 103 are shown with the same reference numbers for the purpose of clarity.

The locomotion system 110 of the another platform 103 can be further configured to move the another platform 103 into a preselected warning distance 158. While still referring to FIG. 6, the preselected warning distance 158 can be defined as a gap between the platform 102 and the another platform 103. Desirably, the preselected warning distance 158 can give a driver time to be aware that the driver is approaching the event zone 124, so the driver can be prepared to brake if necessary. It should be appreciated that the preselected warning distance 158 can also be used to warn drivers of other approaching events. A nonlimiting example, can include a car accident. In addition, it should be appreciated that the locomotion system 110 of the platform 102 can be likewise configured to move the platform 102 to the preselected warning distance 158.

In certain examples, the traffic indicator module 134 of the platform 102 can be at least one of the traffic light module 136 and the stop sign module 138 and the traffic indicator module 134 of the another platform 103 can be the warning module 140, as shown in FIG. 6. This configuration can be helpful in controlling traffic around the event zone 124. In particular, the platform 102 can be positioned in the preselected position 122 adjacent to the event zone 124, while the another platform 103 can be positioned at the preselected warning distance 158. Advantageously, this can permit the platform 102 to control the flow of traffic by shifting traffic to the opposite lane, around the event zone 124, while the another platform 103 puts approaching drivers on notice that they can be stopped by the platform 102, depending on the traffic conditions. It should be appreciated that one skilled in the art can employ different configurations for the platform 102 and the another platform 103, within the scope of this disclosure.

Figure 7:
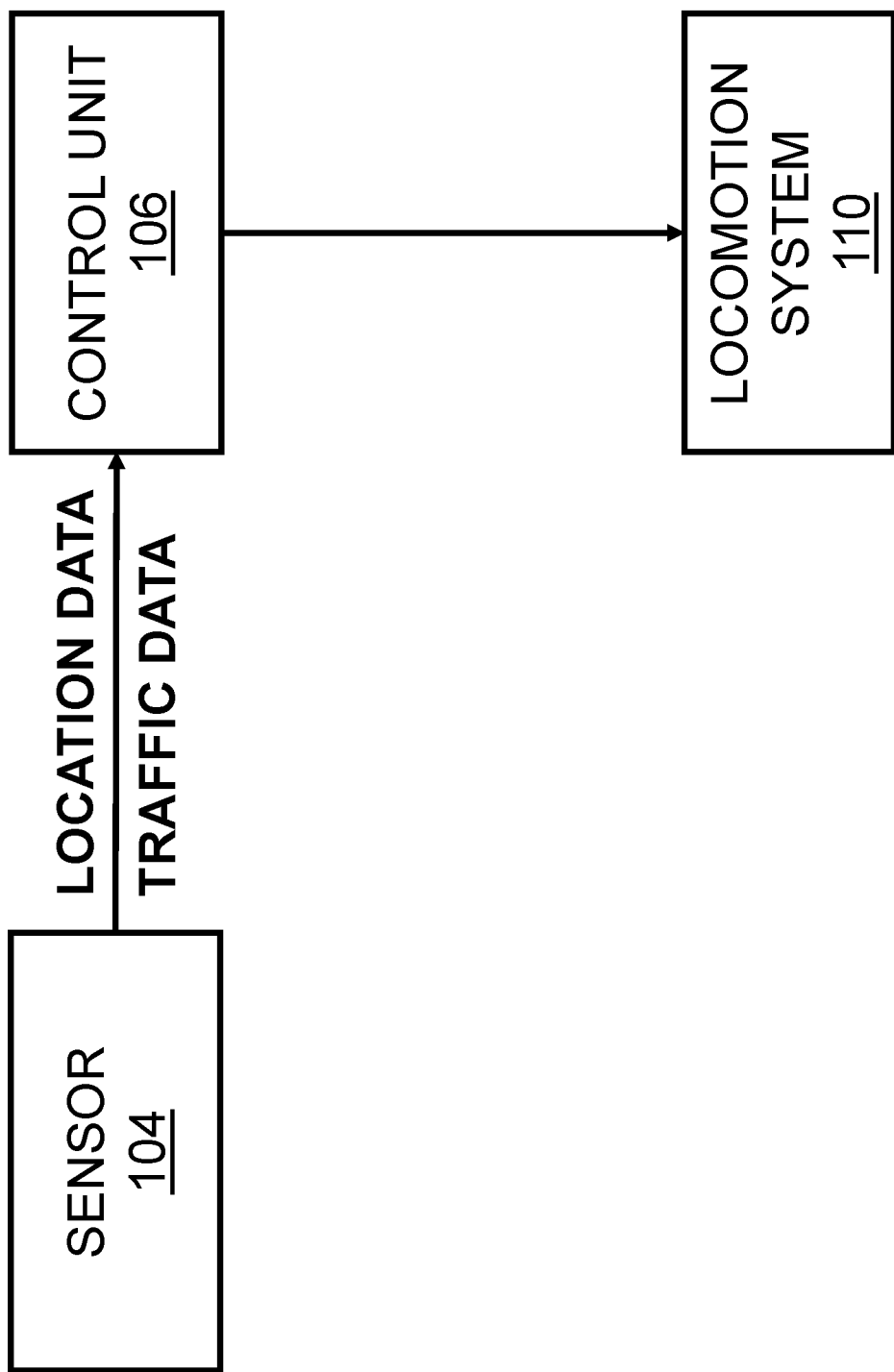
FIG. 7 is a schematic illustration of the traffic controlling system, according to an embodiment of the present disclosure, showing an interaction between the sensor, the control unit, and the locomotion system.

With reference to FIG. 7, one or more sensors 104 can be utilized by the traffic controlling system 100 to generate various types of data, including traffic-related information and/or location data. In certain examples, the sensor 104 can include a plurality of sensors 104. The sensor 104 can be configured to generate at least one of traffic-related information and a location data. The traffic-related information can include traffic patterns, traffic density, road quality, weather conditions, etc. Other types of traffic-related data can be included with the traffic-related information. In certain examples, the traffic-related information can be used to optimize the positioning and repositioning of the platform 102 and/or the another platform 103. For instance, the traffic-related information can include the location of a pothole. The location of the pothole can then be used by the traffic controlling system 100 to reroute the platform 102 and/or the another platform 103 around the pothole. In another example, the traffic-related information can include a number of approaching vehicles or can account for a number or length of queued vehicles. The traffic controlling system 100 can use the number of approaching vehicles in determining when a sufficient opportunity to position and reposition the platform 102 and/or the another platform 103 occurs, switch signal, and/or warn of certain conditions.

The location data can include information that can be used to approximate the location of at least one of the platform 102, the another platform 103, and the event zone 124. The location data can include geolocation data and time information. The geolocation data and time information can be utilized to approximate the location of at least one of the platform 102, the another platform 103, and the event zone 124 at a given time. A skilled artisan can select other types of data to be included in the location data, as desired. It should be appreciated that the sensor 104 can utilize other technologies to generate the location data of one of at least one of the platform 102 and the another platform 103. Non-limiting examples can include radar, lidar, lasers, and sonar.

Now referring to FIGS. 1 and 3-4, the sensor 104 can include area scanner 160, a camera 162, and a navigation unit 164. The area scanner 160 can be disposed on the platform 102 and/or the another platform 103. In certain examples, the area scanner 160 include a distance detector and be configured to measure the distance from a detected object with the area scanner 160. For example, the area scanner 160 could measure the distance between an approaching vehicle 161 and the area scanner 160 disposed on the platform 102. Desirably, this can permit the traffic controlling system 100 to be aware of how far an approaching vehicle 161 is to calculate if the platform 102 should be repositioned, stopped, or if a warning light should trigger on the traffic indicator module 134. A non-limiting example of the area scanner 160 can be a laser rangefinder. The laser rangefinder can use a laser beam to determine the distance to the detected object. The laser rangefinder can operate on the time-of-flight principle by sending a laser pulse in a narrow beam towards the detected object and measuring the time taken by the pulse to be reflected off the detected object and returned to the laser rangefinder. It should be appreciated that other methods and technologies can be employed by one skilled in the art for the area scanner 160, as desired.

While still referring to FIGS. 1 and 3-4, the camera 162 can be configured to capture images of objects and the environment within a field of view of the camera 162. In certain examples, the camera 162 can provide a livestream of the objects and environment in the field of view to the user. Non-limiting examples of the camera 162 can include consumer cameras, machine vision cameras, etc. Advantageously, the camera 162 can provide traffic-related information to the traffic controlling system 100, which can be used when positioning and repositioning the platform 102 and/or the another platform 103. In certain examples, captured data from the camera 162 can be used for traffic surveillance and amber alert tracking. It should be appreciated that a skilled artisan can employ different camera technologies for the camera 162, within the scope of this disclosure.

The navigation unit 164 can be configured to generate the location data. A non-limiting example of the navigation unit 164 can include a satellite-based radionavigation system, such as the Global Positioning System (GPS). Desirably, this can permit the location of at least one of the platform 102 and/or the another platform 103 to be determined with sufficient accuracy. It should be appreciated that one skilled in the art can select different navigation systems for the navigation unit 164, as desired.

Other non-limiting examples of the sensor 104 can include temperature sensors, azimuth sensors, elevation sensors, gyroscopes, barometers, compasses, sonar technology, lidar technology, radar technology, etc. However, it should be appreciated that other types of sensor technologies are contemplated for the sensor 104 or a combination thereof within the scope of this disclosure.

The event zone 124 can have at least one reference point 166, as shown in FIG. 6. The reference point 166 can be configured to be used a reference by the sensor 104 to approximate the location of the event zone 124. Non-limiting examples of the reference point 166 can include a preselected truck, a preselected piece of equipment, a preselected flag, a preselected cone, and a preselected marker. The reference point 166 can include a longitude coordinate and a latitude coordinate. The longitude coordinate and the latitude coordinate can be generated using a satellite-based radionavigation system, such as the Global Positioning System (GPS). Advantageously, the longitude coordinate and the latitude coordinate can be used by the traffic controlling system 100 to approximate the location of the reference point.

In certain examples, the sensor 104 can be configured to detect the reference point 166 of the event zone 124. Desirably, this can allow the traffic controlling system 100 to determine the approximate location of the event zone 124 with respect to the sensor 104. In addition, the traffic controlling system 100 can use this information to position the platform 102 and/or the another platform 103 at a predetermined distance 168 from the reference point 166. The predetermined distance 168 can be defined as the distance between the platform 102 and/or the another platform 103 with the reference point 166.

Advantageously, this can permit the platform 102 and/or the another platform 103 to be more precisely positioned at a predetermined distance 168 from the reference point 166. It should be appreciated that a person skilled in the art can select different objects to be used as the reference point 166. In addition, it should also be appreciated that the number of reference point 166 can be scaled by a skilled artisan, as desired.

With reference to FIG. 7, the control unit 106 can be in communication with the sensor 104 and the locomotion system 110. This can be accomplished through wired technology, wireless technology, cellular technology, or other suitable means. In certain examples, the control unit 106 can be controlled via a transceiver 170. A non-limiting example of a transceiver 170 can include a radio antenna. The transceiver 170 can be configured to receive instructions from the user. However, it should be appreciated that other methods can be used to transmit and receive information to the control unit 106.

The control unit 106 can have a processor and memory. The memory can include a tangible, non-transitory computer readable medium with processor-executable instructions stored thereon. Non-limiting examples of the control unit 106 can be a server, a cloud server, a programmable logic controller (PLC), a computer, and a human-machine interface (HMI). Different types of technology can be employed for the control unit 106, within the scope of this disclosure. In some examples, the control unit 106 can be remotely disposed from the platform 102 and/or the another platform 103. In other instances, the control unit 106 can be disposed on at least one of the platform 102 and the another platform 103. It should be appreciated that a skilled artisan can scale the number of the control unit 106, as desired.

The control unit 106 can be configured to receive at least one of the traffic-related information and the location data. In some instances, the control unit 106 can be continuously receiving the location data and the traffic-related information from the sensor 104. In other instances, the control unit 106 can receive the location data and the traffic-related information from the sensor 104 at a predetermined interval. The predetermined interval can be scaled according to how often the platform 102 and/or the another platform 103 needs to be positioned and repositioned.

The control unit 106 can also be configured to determine if the platform 102 and/or the another platform 103 is in the preselected position 122. This can be accomplished by comparing the location data with the preselected position 122. Specifically, the control unit 106 can compare the location data of the platform 102 and/or the another platform 103 with the preselected position 122. If the approximated location of the platform 102 and/or the another platform 103 is different than the preselected position 122, then the control unit 106 can determine the platform 102 and/or the another platform 103 is not in the preselected position 122. As will be discussed in the further detail below, the control unit 106 can be configured to automatically control and adjust the positioning of the platform 102 and/or the another platform 103. In addition, the control unit 106 can configured to receive instructions from the user.

In addition, the control unit 106 can be configured to determine if the platform 102 and/or the another platform 103 is at the predetermined distance 168 by comparing the location data and the time and location when the sensor 104 detected the reference point 166. For example, the control unit 106 can compare the location data of the platform 102 and/or the another platform 103 with the predetermined distance 168. If the approximated location of the platform 102 and/or the another platform 103 is different than the predetermined distance 168, then the control unit 106 can determine the platform 102 and/or the another platform 103 is not in the predetermined distance 168. The predetermined distance 168 can also be used to determine if the platform 102 and/or the another platform 103 is in the preselected position 122 by comparing the predetermined distance 168 with the location of the event zone 124. For example, if the event zone 124 is five (5) feet from the preselected position 122 and the platform 102 is at the predetermined distance 168, which is six (6) feet from the preselected position 122, then the control unit 106 can determine where the platform 102 is with respect to the preselected position 122. In this way, the platform 102 and the another platform 103 can move in response to movement of the reference point. For example, where the reference point includes a road maintenance vehicle or road maintenance equipment, the vehicle or equipment may move as work is completed, where the platform 102 and the another platform 103 can move in response thereto. A moving work event zone can therefore be followed by the platform 102 and the another platform 103.

The control unit 106 can be further configured to execute instructions to position and reposition the platform 102 and/or the another platform 103. The instructions can include a pathway that the platform 102 and/or the another platform 103 needs to travel to be positioned in the preselected position 122. The pathway can include a distance and direction between the platform 102 and/or the another platform 103 with the preselected position 122. Desirably, the pathway can permit the platform 102 and/or the another platform 103 to be positioned or repositioned in the preselected position 122, without having to manually move the platform 102 and/or the another platform 103. It should be appreciated that a skilled artisan can select different variables and information to be included with the pathway, within the scope of this disclosure.

The instructions can further include a warning pathway that the platform 102 and/or the another platform 103 needs to travel to be positioned in the preselected warning distance 158. The warning pathway can include a distance and direction between the platform 102 and/or the another platform 103 with the preselected warning distance 158. Desirably, the warning pathway can permit the platform 102 and/or the another platform 103 to be positioned or repositioned in the preselected warning distance 158, without having to manually move the platform 102 and/or the another platform 103 to the preselected warning distance 158. It should be appreciated that a skilled artisan can select different variables and information to be included with the warning pathway, within the scope of this disclosure.

In certain examples, the control unit 106 can be configured to generate the instructions. For example, the control unit 106 can be configured to generate the pathway by comparing the approximate position of the platform 102 and/or the another platform 103 with the preselected position 122, and then determine the distance and direction between the platform 102 and/or the another platform 103 with the preselected position 122. The pathway can also be generated by comparing the predetermined distance 168 with the location of the event zone 124. It should be appreciated that a skilled artisan can employ different methods for generating the pathway, within the scope of this disclosure.

In addition, the control unit 106 can be configured to generate the predetermined distance 168 by comparing the approximate position of the platform 102 and/or the another platform 103 with the reference point 166, and then determine the distance and direction between the platform 102 and/or the another platform 103 with the preselected distance. It should be appreciated that a person skilled in the art can select different methods for generating the predetermined distance 168, within the scope of this disclosure.

The control unit 106 can also be configured to generate the warning pathway by comparing the approximate position of the platform 102 and/or the another platform 103 with the preselected warning distance 158, and then determining the distance and the direction between the platform 102 and/or the another platform 103 with the preselected warning distance 158. It should be appreciated that one skilled in the art can select different methods for generating the warning pathway, as desired.

Figure 8:
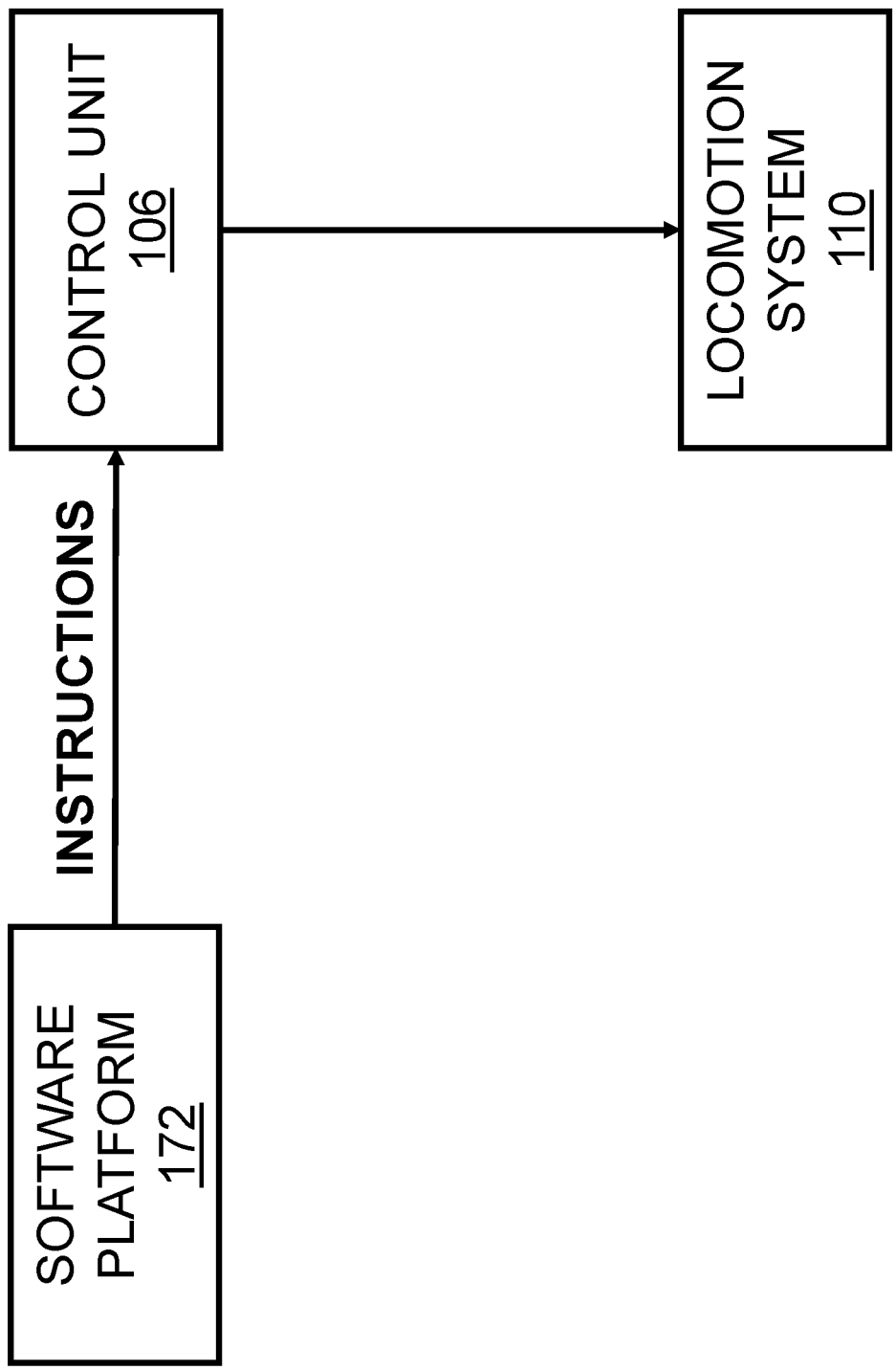
FIG. 8 is a schematic illustration of the traffic controlling system, according to an embodiment of the present disclosure, showing an interaction between a software platform, the control unit, and the locomotion system.

Now referring to FIG. 8, interactions between a software platform 172, the control unit 106, and the locomotion system 110 are shown where the user can generate the instructions. Desirably, this can permit more control and customization of the instructions. The control unit 106 can be in communication with the software platform 172 having a graphical user interface (GUI). The GUI can be configured to receive the instructions from the user and transmit the instructions to the control unit 106. Desirably, this can permit the user to interact with the control unit 106 via the software platform 172. In some instances, the software platform 172 can be at least one of a dedicated application, a mobile application, and a web application. It should be appreciated that a person skilled in the art can employ different features for the software platform 172, within the scope of this disclosure.

The instructions can also include at least one update to one of the pathway, the predetermined distance 168, and the warning pathway that the platform 102 and/or the another platform 103. Desirably, updating the pathway, the predetermined distance 168, and the warning pathway can permit the traffic controlling system 100 to maintain the platform 102 and/or the another platform 103 in the desired position, even when the preselected position 122 and/or the preselected warning distance 158 changes. For example, the preselected position 122 can change as the moving event zone 124 moves along a road. Advantageously, this permits the traffic controlling system 100 to control the flow of traffic around the moving event zone 124 as it moves, unlike conventional traffic controlling methods that can require entire roads to be shut down to compensate for when the event zone 124 needs to be moved. One of the pathway, the predetermined distance 168, and the warning pathway can be updated every update set interval. In certain instances, the update set interval substantially continuously. In other instances, the update set interval is every couple of minutes. A skilled artisan can scale the update set interval, when appropriate (e.g., a lower set interval for situations where the platform 102 needs to be repositioned faster). In addition, in certain examples, the user can update and provide pathway, the predetermined distance 168, and the warning pathway to the control unit 106 as well. It should be further appreciated that a skilled artisan can select other methods for updating the pathway, the predetermined distance 168, and the warning pathway, within the scope of this disclosure.

The control unit 106 can be configured to automatically engage the locomotion system 110 to position the platform 102 and/or the another platform 103 using the instructions. For example, the control unit 106 can act as an autopilot and directly operate the locomotion system 110 to position the platform 102 and/or the another platform 103 into the preselected position 122 using the instructions. Advantageously, the control unit 106 can be used to automatically adjust the platform 102 and/or the another platform 103 as the moving event zone 124 moves along that road, which can facilitate seamless transitions as the work gets completed. In certain examples, the user directs the control unit 106 to engage the locomotion system 110 to position. For example, the user can use the GUI of the software platform 172 to direct the control unit 106 to engage the locomotion system 110 for positioning the platform 102 and/or the another platform 103. Desirably, this can allow the user to have precise control over movements the platform 102 and/or the another platform 103.

It should be appreciated that the sensor 104 and the control unit 106 can be combined with one or more modules to accomplish the same or similar functions, within the scope of this disclosure.

With reference to FIGS. 9, methods 200 of using the traffic controlling system 100 are shown. The method 200 having a step 202 of providing the traffic controlling system 100 having the platform 102. The sensor 104 can generate the location data of the platform 102, in a step 204. In a step 206, the sensor 104 can send the location data to the control unit 106. The control unit 106 can receive the location data, in a step 208. In a step 210, the control unit 106 can determine if the platform 102 is in the preselected position 122 by comparing the preselected position 122 with the location data. The control unit 106 can execute the instructions including the pathway that the platform 102 needs to travel to be positioned in the preselected position 122, in a step 212.

Now referring to FIG. 10, methods 200' can include a step of providing the another platform 103, in a step 214. In step 216, the control unit 106 can determine if the another platform 103 is in the preselected warning distance 158 by comparing the preselected warning distance 158 with the location data. The instructions executed by the control unit 106 in the step 212 can include the warning pathway that the another platform 103 needs to travel to be positioned in the preselected distance.

Advantageously, the traffic controlling system 100 and method can automatically position and reposition the platform 102 and/or the another platform 103. In addition, the platform 102 and/or the another platform 103 can each receive the traffic indicator module 134. Desirably, this can permit the platform 102 and/or the another platform 103 to be customized for a given task.

While certain representative embodiments and details have been shown for purposes of illustrating the invention, it will be apparent to those skilled in the art that various changes can be made without departing from the scope of the disclosure, which is further described in the following appended claims.

What is claimed is:

1. A traffic controlling system, comprising:
   a platform having a top side, a locomotion system, and a receiving area, the locomotion system configured to move the platform into a preselected position, the receiving area disposed on the top side and configured to receive a traffic indicator module,
   a sensor configured to generate a location data of the platform, the sensor including an area scanner to detect an object and generate a location data of the object; and
   a control unit in communication with the sensor and the locomotion system, the control unit configured to receive the location data of the platform and the location data of the object at a predetermined interval, determine if the platform is in the preselected position, and execute instructions including a pathway that the platform needs to travel to be positioned in the preselected position, wherein the pathway avoids the object, the instructions further including adjusting the predetermined interval at which the control unit receives the location data of the platform and the location data of the object in response to a determined distance between the platform and the object.

2. The traffic controlling system of claim 1, wherein the preselected position includes a reference point adjacent to an event zone.

3. The traffic controlling system of claim 2, wherein the sensor is configured to detect the reference point, the control unit is configured to determine if the platform is at a predetermined distance from the reference point, and the preselected position includes the predetermined distance for positioning the platform with respect to the reference point.

4. The traffic controlling system of claim 1, further comprising:
   another platform having a top side, a locomotion system, and a receiving area, the locomotion system configured to move the another platform into a preselected position, the receiving area disposed on the top side and configured to receive a traffic indicator module, a sensor configured to generate location data of the another platform, and a control unit in communication with the sensor and the locomotion system, the control unit configured to receive the location data, determine if the another platform is in the preselected position, and execute instructions including a pathway that the another platform needs to travel to be positioned in the preselected position, and wherein the locomotion system is further configured to move the another platform into a preselected warning distance, the preselected warning distance defined as a gap between the another platform and the platform.

5. The traffic controlling system of claim 4, wherein the instructions include a warning pathway that the another platform needs to travel to be positioned in the preselected warning distance.

6. The traffic controlling system of claim 1, wherein the preselected position is adjacent to a moving event zone.

7. The traffic controlling system of claim 6, wherein the instructions include at least one update to the pathway that the platform needs to travel to maintain the platform in the preselected position.

8. The traffic controlling system of claim 1, wherein the sensor includes a satellite-based radio navigation system.

9. The traffic controlling system of claim 1, wherein the control unit is located remotely from the platform.

10. The traffic controlling system of claim 1, wherein control unit is configured to generate the instructions.

11. The traffic controlling system of claim 1, wherein the control unit is configured to receive the instructions from a user.

12. A method using a traffic controlling system, comprising:

providing the traffic controlling system including:
a platform having a top side, a locomotion system, and a receiving area, the locomotion system configured to move the platform into a preselected position, the receiving area disposed on the top side and configured to receive a traffic indicator module, a sensor configured to generate a location data of the platform, the sensor including an area scanner configured to detect an object and generate a location data of the object, and a control unit in communication with the sensor and the locomotion system, the control unit configured to receive the location data of the platform and the location data of the object at a predetermined interval, determine if the platform is in the preselected position, and execute instructions including a pathway that the platform needs to travel to be positioned in the preselected position, wherein the pathway avoids the object, the instructions further including adjusting the predetermined interval at which the control unit receives the location data of the platform and the location data of the object in response to a determined distance between the platform and the object;

generating, by the sensor, the location data of the platform;

sending, by the sensor, the location data to the control unit;

receiving, by the control unit, the location data;

determining, by the control unit, if the platform is in the preselected position by comparing the preselected position with the location data; and executing, by the control unit, the instructions including the pathway that the platform needs to travel to be positioned in the preselected position.

13. The traffic controlling system of claim 1, wherein the area scanner includes a distance detector.

14. The traffic controlling system of claim 13, wherein the distance detector includes a laser rangefinder.

15. The traffic controlling system of claim 1, wherein the sensor further comprises a camera configured to capture an image of the environment around the platform.

16. The traffic controlling system of claim 1, wherein a road maintenance module is disposed on the receiving area of the platform.

17. A traffic controlling system, comprising:

a platform having a top side, a locomotion system, and a receiving area, the locomotion system configured to move the platform into a preselected position, the receiving area disposed on the top side and configured to receive a traffic indicator module;

a sensor including an area scanner and a navigation unit, the area scanner configured to detect an object in an area, determine a location data of the object, and measure a distance between the platform and the object, the navigation unit configured to generate a location data of the platform;

a control unit in communication with the sensor and the locomotion system, the control unit configured to receive the location data of the object and the location data of the platform at a predetermined interval, determine if the platform is in the preselected position, and execute instructions including a pathway that the platform needs to travel to be positioned in the preselected position and determine if the platform should be rerouted, repositioned, or stopped based on the distance between the platform and the location data of the object, the instructions further including adjusting the predetermined interval at which the control unit receives the location data of the platform and the location data of the object in response to a determined distance between the platform and the object.

18. The traffic controlling system of claim 17, further comprising another platform having another locomotion system configured to move the another platform into a preselected warning distance, the preselected warning distance defined as a gap between the another platform and the platform.

19. The traffic controlling system of claim 18, wherein the sensor further comprises a camera configured to capture an image of the environment around the platform and the another platform.

* * * * *